US010613541B1

(12) United States Patent
Ebrahimi Afrouzi et al.

(10) Patent No.: US 10,613,541 B1
(45) Date of Patent: Apr. 7, 2020

(54) SURFACE COVERAGE OPTIMIZATION METHOD FOR AUTONOMOUS MOBILE MACHINES

(71) Applicants: Ali Ebrahimi Afrouzi, San Jose, CA (US); Soroush Mehrnia, Copenhagen (DK); Sebastian Schweigert, Oakland, CA (US)

(72) Inventors: Ali Ebrahimi Afrouzi, San Jose, CA (US); Soroush Mehrnia, Copenhagen (DK); Sebastian Schweigert, Oakland, CA (US)

(73) Assignee: AI Incorporated, Toronto (CA)

( * ) Notice: Subject to any disclaimer, the term of this patent is extended or adjusted under 35 U.S.C. 154(b) by 449 days.

(21) Appl. No.: 15/406,890

(22) Filed: Jan. 16, 2017

Related U.S. Application Data (60) Provisional application No. 62/295,977, filed on Feb. 16, 2016, provisional application No. 62/347,800, filed on Jun. 9, 2016.

(51) Int. Cl.
  *G05D 1/02* (2020.01)
(52) U.S. Cl.
  CPC .......... *G05D 1/0219* (2013.01); *G05D 1/024* (2013.01); *G05D 1/0221* (2013.01); *G05D 1/0276* (2013.01)
(58) Field of Classification Search
  None
  See application file for complete search history.

(56) References Cited

U.S. PATENT DOCUMENTS

| 7,349,759 | B2 | 3/2008 | Peless et al. |
| 9,026,302 | B2 | 5/2015 | Stout et al. |
| 9,701,020 | B1 * | 7/2017 | Ebrahimi Afrouzi ........................ G05D 1/0219 |
| 10,207,408 | B1 * | 2/2019 | Ebrahimi Afrouzi ........................ B25J 9/1676 |
| 2008/0046125 | A1 | 2/2008 | Myeong et al. |
| 2008/0249661 | A1 | 10/2008 | Hong et al. |
| 2009/0182464 | A1 | 7/2009 | Myeong et al. |
| 2011/0125324 | A1 | 5/2011 | Baek |
| 2011/0167574 | A1 | 7/2011 | Stout et al. |
| 2013/0345922 | A1 | 12/2013 | Biber et al. |

OTHER PUBLICATIONS

Gabriely, Yoav; Spanning-Tree Based Coverage of Continuous Areas by a Mobile Robot; Israel Institute of Technology; Dec. 1999; http://biorobotics.ri.cmu.edu/papers/sbp_papers/integrated4/gabriely_spanning.pdf (Year: 1999).*

(Continued)

*Primary Examiner* — David P. Merlino (57) ABSTRACT

A system and method for devising a surface coverage scheme within a workspace. Space within a two-dimensional map of the workspace is identified as free, occupied, or unknown. The map is divided into a grid of cells. A loop-free spanning tree is constructed within all free cells within the grid. The robotic device is programmed to drive along the outside edge of the spanning tree to cover all portions of each free cell at least once upon completing the path. The system monitors several performance parameters during each work session and assigns negative rewards based on these parameters. A large positive reward is assigned upon completion of the surface coverage. Spanning trees with at least slight differences are used to determine which spanning tree produces the highest reward. The system is programmed to attempt maximize rewards at all times, causing the system to learn the best eventual method or policy for servicing the workspace.

20 Claims, 4 Drawing Sheets

(56) References Cited

OTHER PUBLICATIONS

Choi, Young-Ho; Online Complete Coverage Path Planning for Mobile Robots based on Linked Spiral Paths using Constrained Inverse Distance Transform; 2009; IEEE/RSJ International Conference on Intelligent Robots and Systems; p. 5788-5793; https://ieeexplore.ieee.org/abstract/document/5354499 (Year: 2009).*

Guruprasad; ST-CTC: A Spanning Tree-based Competitive and Truly Complete Coverage Algorithm for Mobile Robots; Jul. 2015; Proceedings of the 2015 Conference on Advances in Robotics; https://dl.acm.org/citation.cfm?id=2783492 (Year: 2015).*

Lee, Tae-Kyeong; Smooth coverage path planning and control of mobile robots based on high-resolution grid map representation; Oct. 2011; Robotic and Autonomous Systems, v59 is10, p. 801-812; https://www.sciencedirect.com/science/article/pii/S0921889011000996 (Year: 2011).*

Galceran et al., "A survey on coverage path planning for robotics", Sep. 20, 2013, Elsevier, Robotics and Autonomous Systems, p. 1258-1276, https://www.sciencedirect.com/science/article/pii/S092188901300167X (Year: 2013).*

Choset, "Coverage for robotics—A survey of recent results", Oct. 2001, Annals of Mathematics and Artificial Intelligence, vol. 31, iss 1-4, p. 113-126, https://rd.springer.com/article/10.1023/A:1016639210559 (Year: 2001).*

Zelinsky et al., "Planning paths of complete coverage of an unstructured environment by a mobile robot", 1993, http://pinkwink.kr/attachment/cfile3.uf@1354654A4E8945BD13FE77.pdf (Year: 1993).*

Huang, "Optimal line-sweep-based decomposition for coverage algorithms", Apr. 18, 2006, IEEE, International Conference on Robotics and Automation, p. 27-32, https://ieeexplore.ieee.org/abstract/document/932525 (Year: 2006).*

Hazon et al., "Constructing spanning trees for efficient multi-robot coverage", Jun. 26, 2006, IEEE, International conference on robotics and automation, p. 1698-1703, https://ieeexplore.ieee.org/abstract/document/1641951 (Year: 2006).*

* cited by examiner

SURFACE COVERAGE OPTIMIZATION METHOD FOR AUTONOMOUS MOBILE MACHINES

CROSS-REFERENCE TO RELATED APPLICATIONS

This application claims the benefit of the provisional patent application Ser. No. 62/295,977 filed Feb. 16, 2016 and provisional patent application Ser. No. 62/347,800 filed Jun. 9, 2016 by the present inventors.

FIELD OF THE INVENTION

The present invention relates to methods for creating and optimizing a surface coverage scheme for mobile robotic devices.

BACKGROUND

Robotic devices are being used with increasing frequency for jobs that require surface coverage. A robotic device may be used, for instance, for wiping windows, cutting grass, mopping floors, vacuuming floors, painting surfaces, etc. In all of these applications, the problem of surface coverage may be solved in different ways. In some cases, a boustrophedon pattern or other planned pattern is used. However, a preplanned path may not be very effective in dynamic environments or suitable for all different types of environments, for example, ones with many obstacles throughout the surface to be covered. A boustrophedon pattern could result in a robotic device performing an excessive number of rotations to turn around at the end of each stroke due to a high number of obstacles in an area. It may be preferable to use coverage schemes that minimize the number of rotations or turns that a robotic device makes because turning may take longer than driving forward and may thus then lengthen the amount of time needed to complete a job. Reducing the number of turns may also save energy. It may also be preferable to avoid retracing already covered surfaces so that time is not wasted covering area that has already been treated or worked on.

A need exists for a surface coverage scheme that more effectively deals with the above presented problems.

SUMMARY

It is a goal of the present invention to provide a surface coverage method that will improve itself over time by measuring various parameters and comparing the outcomes of each completed job.

It is a goal of the present invention to provide a surface coverage method that addresses the problems of redundancy, frequency of collisions, time to complete a job and thoroughness.

DETAILED DESCRIPTION OF THE INVENTION

The present invention proposes a method for optimizing a coverage scheme for mobile robotic devices by devising and executing multiple coverage schemes and analyzing the results of each scheme.

For the purposes of this invention, a mobile robotic device comprises, at minimum, a set of wheels for moving the machine, a motor to drive the wheels, a battery to power the machine, a central processing unit to devise a plurality of movement plans, a memory unit to store data regarding performance and past movement plans, and at least one sensor to sense at least one condition regarding performance.

Throughout the process, a mobile robotic device uses a two-dimensional map of the workspace to develop a coverage scheme within that map. A map of the environment may be generated by the mobile robotic device with sensors using SLAM (simultaneous localization and mapping) or may be provided to the machine. The problem of generating a map of a workspace is not part of the subject of the present invention, and thus a detailed description thereof is not provided.

Space within the map is marked free where no obstacles are present, occupied where obstacles are detected, or unknown, where the system has not determined whether obstacles are present or not. In some embodiments, before proceeding, the mobile robotic device is configured to drive to all unknown areas to determine whether obstacles are present or not and mark the areas as either free or occupied.

In a first step, the free space is divided into a grid of predetermined cell size. The axis of the grid is rotated until such a point as the maximum number of free cells result. In the preferred embodiment, grid cells are approximately two times the width of the mobile robotic device or of a component thereof, for example, a vacuuming port.

Figure 1:
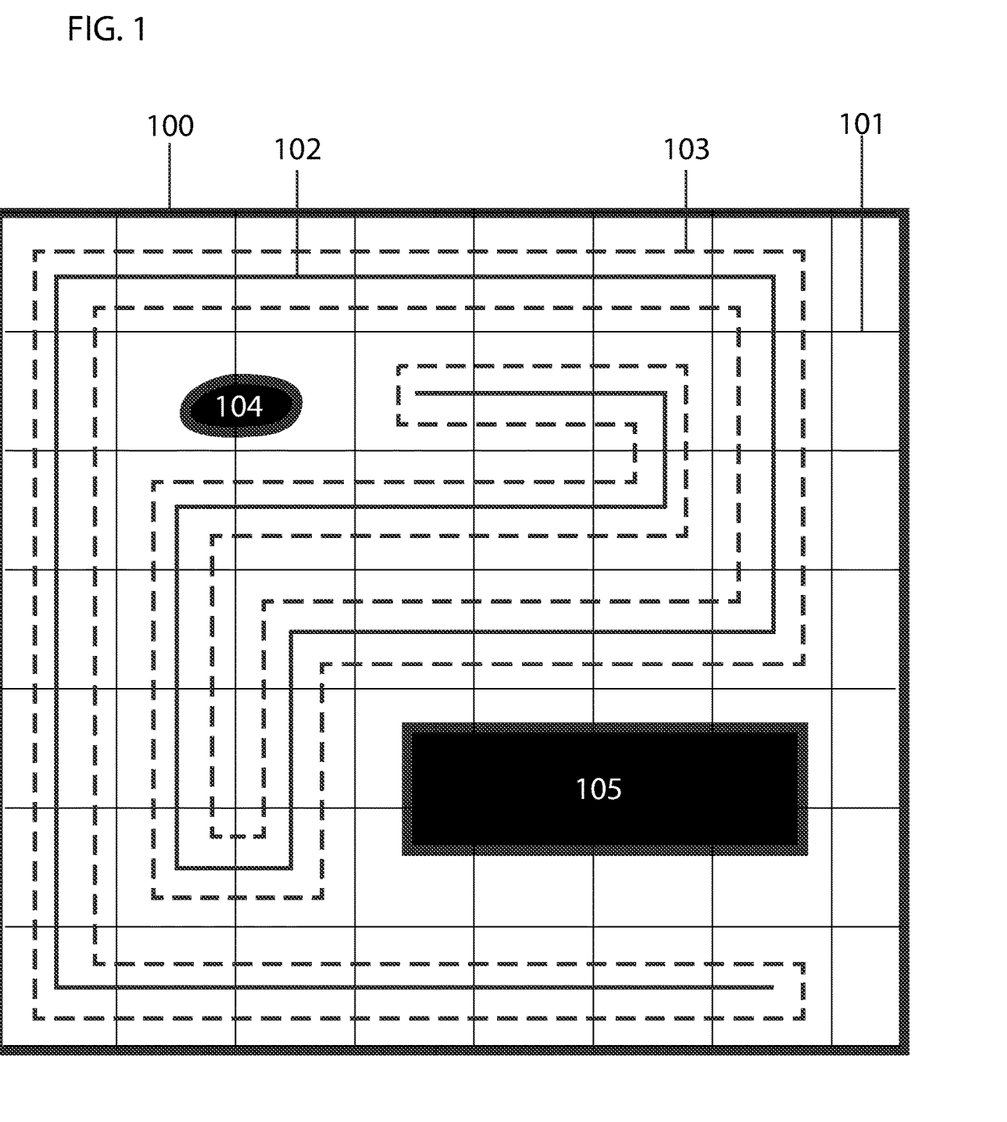
FIG. 1 illustrates an overhead view of a workspace and spanning tree and corresponding coverage path embodying features of the present invention.

In a next step, a first spanning tree is constructed within the grid by connecting the centers of all free cells in a loop-free graph tree. That is, none of the branches of the graph tree are connected, or looped together. Any grid cells that are marked unknown or partially free and partially occupied are discarded in this step. Referring to FIG. 1, a map 100 is divided into a grid 101. The solid line 102 represents a spanning tree. The dashed line 103 shows the path that a mobile robotic device would follow around the outside of the spanning tree 102. The black areas 104, 105 represent occupied space.

Figure 2A:
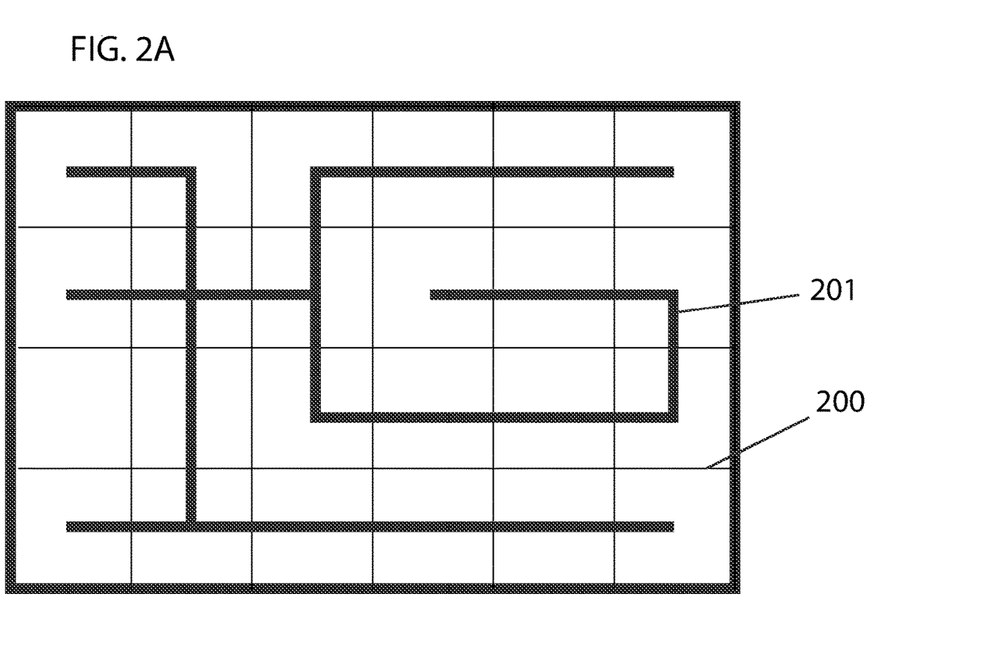
FIG. 2A illustrates an overhead view of a workspace and spanning tree embodying features of the present invention.
Figure 2B:
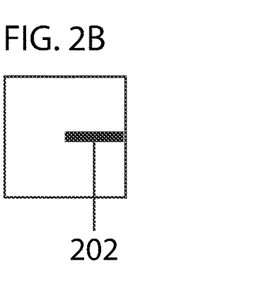
FIG. 2B illustrates a portion of a spanning tree called a leaf embodying features of the present invention.
Figure 2C:
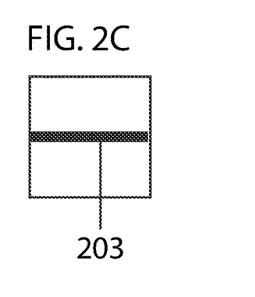
FIG. 2C illustrates a portion of a spanning tree called a straight embodying features of the present invention.
Figure 2D:
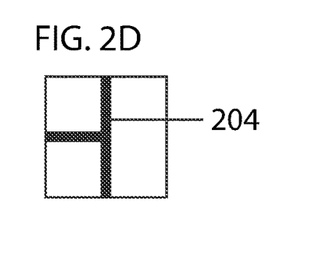
FIG. 2D illustrates a portion of a spanning tree called a T embodying features of the present invention.
Figure 2E:
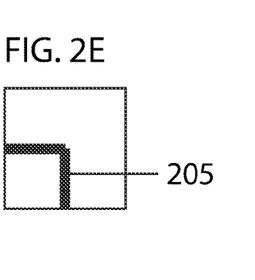
FIG. 2E illustrates a portion of a spanning tree called a bend embodying features of the present invention.
Figure 2F:
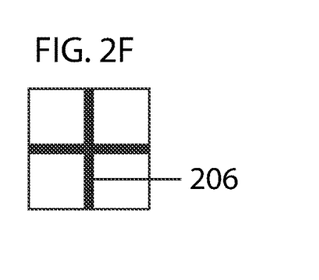
FIG. 2F illustrates a portion of a spanning tree called a plus embodying features of the present invention.
Figure 3A:
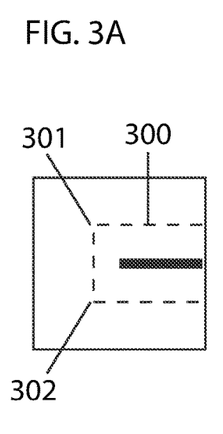
FIG. 3A illustrates the path resulting from following the outer edge of a leaf embodying features of the present invention.
Figure 3B:
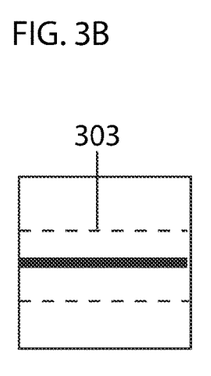
FIG. 3B illustrates the path resulting from following the outer edge of a straight embodying features of the present invention.
Figure 3C:
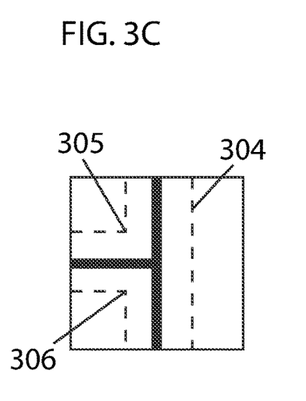
FIG. 3C illustrates the path resulting from following the outer edge of a T embodying features of the present invention.
Figure 3D:
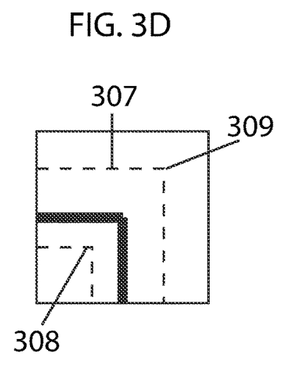
FIG. 3D illustrates the path resulting from following the outer edge of a bend embodying features of the present invention.
Figure 3E:
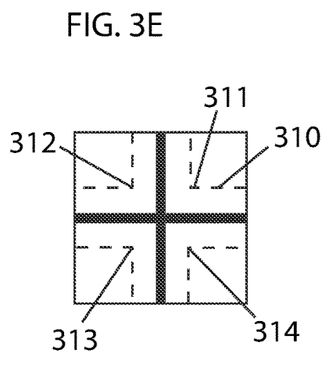
FIG. 3E illustrates the path resulting from following the outer edge of a plus embodying features of the present invention.
Figure 4A:
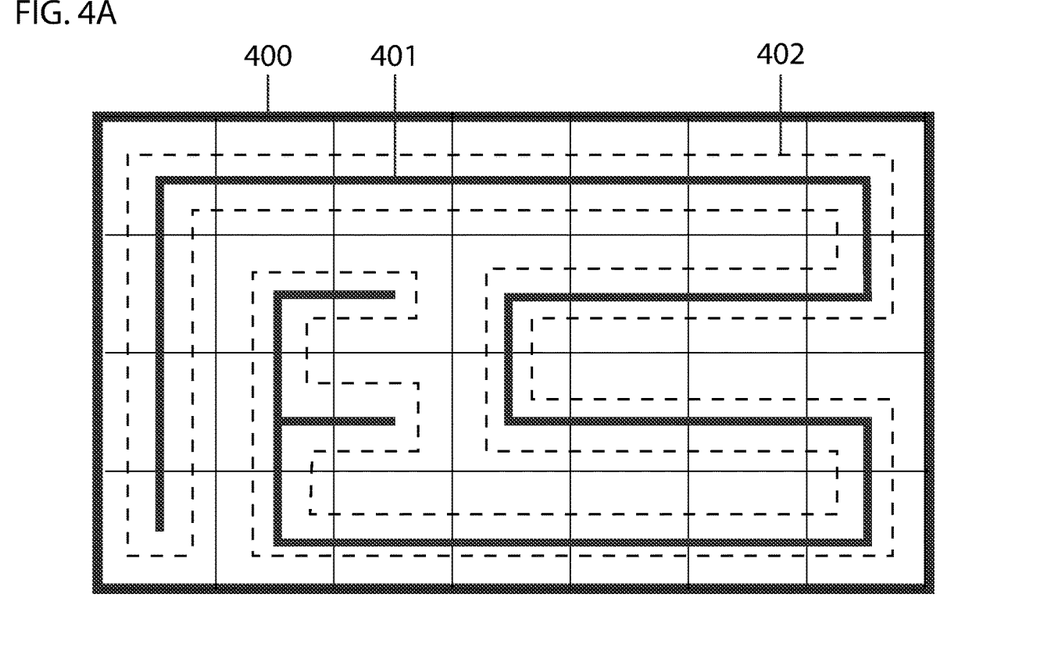
FIG. 4A illustrates an overhead view of a workspace and non-optimized spanning tree and corresponding coverage path embodying features of the present invention.
Figure 4B:
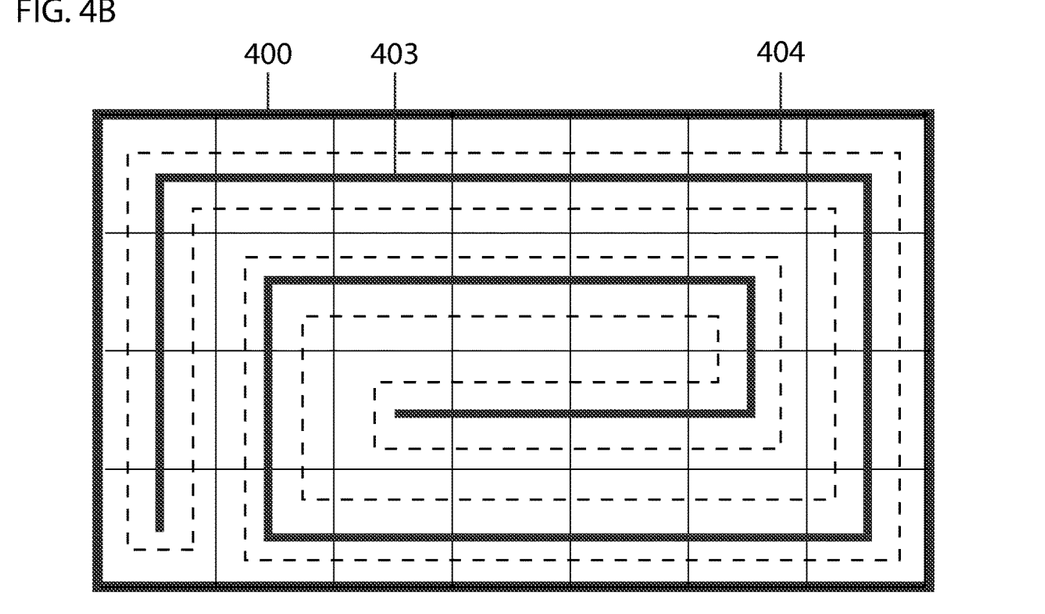
FIG. 4B illustrates an overhead view of a workspace and optimized spanning tree and corresponding coverage path embodying features of the present invention.

In some embodiments, spanning trees are constructed in such a way as to minimize the number of corners or turns found in a path resulting from following the outside edge of the spanning tree. This may be accomplished by analyzing each part of the spanning tree cell by cell. Referring to FIG. 2A, a grid 200 and spanning tree 201 are illustrated. The spanning tree is composed of various parts illustrated in FIGS. 2B-2F. The spanning tree part 202 shown in FIG. 2B shall be referred to as a 'leaf'. The spanning tree part 203 shown in FIG. 2C shall be referred to as a 'straight'. The spanning tree part 204 shown in FIG. 2D shall be referred to as a 'T'. The spanning tree part 205 shown in FIG. 2E shall be referred to as a 'bend'. The spanning tree part 206 shown in FIG. 2F shall be referred to as a 'plus'. Referring to FIGS. 3A-3E, the paths corresponding to following the outer edges of each part of a spanning tree are illustrated. FIG. 3A shows the path 300 resulting from following the edge of a leaf. A leaf produces a path with two corners 301, 302. FIG. 3B shows the path 303 resulting from following the edge of a straight. A straight produces a path with no corners. FIG. 3C shows the path 304 resulting from following the edge of a T. A T produces a path with two corners 305, 306. FIG. 3D shows the path 307 resulting from following the edge of a bend. A bend produces a path with two corners 308, 309. FIG. 3E shows the path 310 resulting from following the edge of a plus. A plus produces a path with four corners 311, 312, 313, 314. To optimize the spanning tree, trees will be constructed with the smallest number of corners in the path that results from following the outside edge of the spanning tree. By following this policy, spanning tree parts that create fewer corners would be used in favor of spanning tree parts that create more corners when possible. Referring to FIG. 4A, a workspace 400 with spanning tree 401 and resulting path 402 is illustrated. This path contains 26 corners. Referring to FIG. 4B, the same grid 400 is shown with an optimized spanning tree 403. The resulting path 404 has only 18 corners because fewer parts that create corners are used.

In a next step, the mobile robotic device is caused to drive along the outside edge of the spanning tree. While driving on the path, the mobile robotic device monitors performance in various ways. In the preferred embodiment, the mobile robotic device includes at least one touch sensor to detect collisions, and the system counts the number of collisions incurred during each job or work session. The system also monitors the amount of area retraced (covered more than once) and the amount of area left uncovered (if any) by the mobile robotic device. Finally, the system monitors the amount of time to complete the entire path. Upon completion of the path, the monitored parameters are saved into a database and associated with the particular spanning tree used that produced them. The value of the particular spanning tree used may be quantified by using a positive and negative rewards system.

Each time a touch sensor detects a collision, a negative reward is assigned to the spanning tree in use. In a like manner, negative rewards are also assigned for area retraced, area left uncovered, and time to complete the job, the amount of reward in each case being greater as deviation from a predefined ideal increases. Upon completion of the job, a large positive reward is assigned to the spanning tree to incentivize the mobile robotic device to complete the job in spite of the negative rewards incurred throughout the job.

In the preferred embodiment, the system creates a new spanning tree for each new job for a first predetermined number of jobs, each new spanning tree with at least some variations from the previously used spanning trees. In this way, the system would gain performance data about various surface coverage patterns.

Execution of each action (movement in any direction) results in the transition from a first state to a next state. The reward (R) of each state (s) may be represented by:

$$R_{(s)} = R_{(s)}\gamma^t$$

Where t is discrete time and γ is a discount factor. A discount factor is included to account for inherent increased likelihood of redundancy as a particular job approaches completion. When a mobile robotic device begins a new work session, it will not retrace any area at first because no area has already been covered. As the device covers more area, the likelihood of retracing already covered areas increases because the area already covered increases.

The reward after the transition from state (s) to (s') may be represented by:

$$R_{(s')} = R_{(s)}\gamma^t + R_{(s+1)}\gamma^{t+1}$$

The cumulative rewards over the course of a work session are combined to determine the payoff of the particular spanning tree used. The total reward for work in a session can be represented by:

$$R_{(s0)}\gamma^t + R_{(s1)}\gamma^t + R_{(s2)}\gamma^t + R_{(s3)}\gamma^t + \ldots + R_{(sm)}\gamma^t = \text{Total reward}$$

The system may be configured to attempt to maximize this value at all times, which is represented by the formula:

$$E\left[\sum_{\gamma^t} R_t\right] \to \text{Max}$$

Where E is the expectation that R (reward) is maximized.

Therefore, the value of state (s) when policy (n) is executed equals the expected sum of all future discounted rewards provided that the initial state (so) is (s) and policy (n) is executed as represented by the formula:

$$\overset{\pi}{_{(s)}}V = E_{\pi_t}\left[\sum_{\gamma'} R_t \,\middle|\, s_0 = s\right]$$

From the above, a value iteration may be concluded:

$$V_{(s)} = \left[\max_{a'} \gamma \sum P(s \mid s, a)V_{(s')}\right] + R_{(s)}$$

Where:
max$_a$=maximizing action
V$_{(s')}$=value of successor
R$_{(s)}$=reward or cost to get to state s
P=state transition function
R=reward function The above formula is found after convergence according to Bellman's equation represented by the formula:

$$\max \sum_{t=0}^{\infty} \beta^t \mu(c_t)$$

subject to $$a_{t+1}=(1+r)(a_t-c_t), \ c_t \geq 0, \text{ and}$$

$$\lim_{t=\infty} a_t \geq 0,$$

and $$V(a)=\max\{\mu(c)+\beta V((1+r)(a-c))\}$$

The value of a given state depends on the outcome of the prior state multiplied by the cost (penalty incurred) to get there. The system can then compare the value of the particular spanning tree used in each work session and determine which spanning tree produced the best results (and thereby has the highest value). As the system completes more and more sessions, each with different spanning trees, more and more data is gathered and values are assigned to each state. That is, a value is assigned to each spanning tree used. Once values have been assigned to spanning trees, the system can calculate a policy to maximize rewards. The system develops a policy, which defines the best spanning tree yet discovered. This is represented by the formula, $$\pi(s) = \operatorname*{argmax}_{s'} \sum P(s' \mid s_1 a) V(s')$$

From value iteration methods one may find policy 1, which is a better policy than policy 0, and then find a policy 2, which is a better than policy 1, and so on. The above formula therefore finds the best eventual policy.

Pa(s,s')=Pr(st+1=s'|st=s, at=a) is the probability that action a in state s at time t will lead to state s' at time t+1

And $R_a(s,s')$ is the immediate reward received after transition to state s' from s And γ∈[0, 1] is the discount factor.

A desirable outcome is to choose a policy, π, that will maximize the expected discounted sum of the rewards collected at any given S. The system uses the policy n to select the best known spanning tree with which to cover the workspace.

In this method, S (state) refers to the state of the device after each action (movement in any direction). A finite number of actions are possible, and thus there are a finite number of resulting states. A is the action selected, which takes the device from state S to state S'.

We claim:

1. A method for covering a surface by a robotic device comprising:
    establishing a two-dimensional map of a workspace using data received from an outside source or gathered from one or more laser rangefinders positioned on the robotic device;
    dividing the two-dimensional map into a grid of cells of predetermined size;
    orienting the cell grid within the two-dimensional map such that the maximum number of whole cells result;
    identifying each cell as free, occupied, or unknown;
    localizing the robotic device within the two-dimensional map;
    completing the two-dimensional map by driving to cells identified as unknown and gathering more data by the one or more laser rangefinders until all unknown cells have been visited and identified as either occupied or free;
    connecting the centers of all free cells to create a spanning tree, wherein the spanning tree is constructed with a minimum number of corners;
    driving the robotic device along an outer edge of the spanning tree until all whole cells in the two-dimensional map are covered at least once by the robotic device;
    monitoring a number of collisions incurred by the robotic device during a work session;
    calculating a negative reward whenever a control or action executed by the robotic device results in a collision during the work session;
    calculating a negative reward based on cells retraced by the robotic device during the work session, cells left uncovered at the end of the work session, and the amount of time taken to complete the work session;
    calculating a positive reward upon completion of the work session; and
    amalgamating all the rewards incurred during or upon completion of the work session to obtain a value metric for the spanning tree used during the work session.

2. The method of claim 1, further comprising:
    multiplying the amalgamated rewards by a decay factor causing the absolute value of the amalgamated rewards to decrease as percent coverage of a work area increases to account for an inherent increase in the probability of retracing cells as work progresses during the work session.

3. The method of claim 1, further comprising:
    creating and utilizing a new spanning tree during each of a predetermined number of work sessions, and thereafter selecting a spanning tree for use based on the value metric thereof.

4. The method of claim 1 wherein the cells are approximately twice the width of the robotic device or of a component thereof.

5. The method of claim 1, wherein driving to cells marked as unknown and gathering more data comprises:
    determining at least one frontier between cells marked as unknown and cells marked as occupied or free; and
    driving the robotic device to the at least one frontier to gather more data.

6. The method of claim 1, wherein the robotic device interrupts a work session to recharge a battery and after resumes the work session at a location of a last covered cell.

7. The method of claim 1, further comprising:
    driving the robotic device along locations corresponding with the edges of the two-dimensional map.

8. A surface coverage method comprising:
    establishing, with a central processing unit of a surface coverage robot, a two-dimensional map of a workspace using data received by the central processing unit from an outside source or gathered from one or more laser rangefinders positioned on the surface coverage robot;
    dividing, with the central processing unit, the two-dimensional map into a grid of cells of predetermined size oriented such that the maximum number of whole cells result;

identifying, with the central processing unit, a cell as free when the central processing unit determines via sensor data that no obstacles are present in an area within the corresponding cell;
identifying, with the central processing unit, a cell as occupied when the central processing unit determines via sensors data that obstacles are present in an area within the corresponding cell;
identifying, with the central processing unit, a cell as unknown when the central processing unit is unable to determine whether or not obstacles are present in an area within the corresponding cell;
localizing, with the central processing unit, the surface coverage robot within the two-dimensional map;
creating, with the central processing unit, a loop-free spanning tree by connecting the centers of all free cells in the two-dimensional map, wherein a number of corners in the loop-free spanning tree is minimized;
instructing, with the central processing unit, the surface coverage robot to drive along an outer edge of the loop-free spanning tree;
monitoring, with the central processing unit, a number of collisions incurred by the surface coverage robot during a work session;
calculating, with the central processing unit, a negative reward whenever a control or action executed by the surface coverage robot results in a collision during the work session;
calculating, with the central processing unit, a negative reward based on cells retraced by the surface coverage robot during the work session, cells left uncovered at the end of the work session, and the amount of time taken to complete the work session;
calculating, with the central processing unit, a positive reward upon completion of the work session; and
amalgamating, with the central processing unit, all the rewards incurred during or upon completion of the work session to obtain a value metric associated with the loop-free spanning tree used during the work session.

9. The method of claim 8 further comprising:
instructing, with the central processing unit, the surface coverage robot to drive to cells identified as unknown and gather more data by the one or more laser rangefinders until all unknown cells have been visited and identified as either occupied or free.

10. The method of claim 8, further comprising:
multiplying, with the central processing unit, the amalgamated rewards by a decay factor causing the absolute value of the amalgamated rewards to decrease as percent coverage of a work area increases to account for an inherent increase in the probability of retracing cells as work progresses during the work session.

11. The method of claim 8, further comprising:
creating and utilizing, with the central processing unit, a new loop-free spanning tree during each of a predetermined number of work sessions, and thereafter selecting a loop-free spanning tree for use based on the calculated value metric thereof.

12. A system for covering a surface by a surface coverage robot comprising:
a tangible, non-transitory, machine readable medium storing instructions that when executed by a central processing unit of the surface coverage robot effectuates operations comprising:
establishing, with the central processing unit, a two-dimensional map of a workspace using data received from an outside source or gathered from one or more sensors positioned on the surface coverage robot;
dividing, with the central processing unit, the two-dimensional map into a grid of cells of predetermined size, the grid oriented such that the maximum number of whole cells result;
marking, with the central processing unit, a cell as free if no obstacles are present within the corresponding cell;
marking, with the central processing unit, a cell as occupied if obstacles are present within the corresponding cell;
marking, with the central processing unit, a cell as unknown if the central processing unit is unable to determine whether or not obstacles are present within the corresponding cell;
localizing, with the central processing unit, the surface coverage robot within the two-dimensional map;
creating, with the central processing unit, a spanning tree by connecting the centers of all free cells in the two-dimensional map;
instructing, with the central processing unit, the surface coverage robot to drive around the spanning tree such that one side of the surface coverage robot is adjacent to a part of the spanning tree at all times;
monitoring, with the central processing unit, a number of collisions incurred by the surface coverage robot during a work session;
calculating, with the central processing unit, a negative reward whenever a control or action executed by the surface coverage robot results in a collision during the work session;
calculating, with the central processing unit, a negative reward based on cells retraced by the surface coverage robot during the work session, cells left uncovered at the end of the work session, and the amount of time taken to complete the work session;
calculating, with the central processing unit, a positive reward upon completion of the work session; and
amalgamating, with the central processing unit, all the rewards incurred during or upon completion of the work session to obtain the value metric associated with the spanning tree used during the work session,
wherein the central processing unit creates a new spanning tree during each of a predetermined number of work sessions of the surface coverage robot, and thereafter selects a spanning tree for use based on the calculated value metrics thereof.

13. The system of claim 12 further comprising:
instructing, with the central processing unit, the surface coverage robot to drive to cells marked as unknown and gather more data by the one or more sensors until all cells marked as unknown have been visited and can be remarked as either occupied or free.

14. The system of claim 13, wherein driving to cells marked as unknown and gathering more data comprises:
determining, with the central processing unit, at least one frontier between cells marked as unknown and cells marked as occupied or free; and
instructing, with the central processing unit, the surface coverage robot to drive to the at least one frontier to gather more data.

15. The system of claim 12 wherein the spanning tree is loop-free and constructed in such a way as to minimize a number of corners in a path around the spanning tree.

16. The system of claim 12, further comprising:
multiplying, with the central processing unit, the amalgamated rewards by a decay factor causing the absolute value of the amalgamated rewards to decrease as percent coverage of a work area increases to account for an inherent increase in the probability of retracing cells as work progresses during the work session.

17. The system of claim 12, further comprising:
marking, with the central processing unit, cells covered by the surface coverage robot during a work session.

18. The system of claim 12, wherein the surface coverage robot interrupts a work session to recharge a battery and after resumes the work session at a location of a last covered cell.

19. The system of claim 12, further comprising:
driving the surface coverage robot along locations corresponding with the edges of the two-dimensional map.

20. The system of claim 12, wherein the cells are at least the width of the surface coverage robot or a component thereof.

\* \* \* \* \*